No. 722,759. PATENTED MAR. 17, 1903.
J. SCALES.
METHOD OF SUBDIVIDING BLOCKS OR INGOTS.
APPLICATION FILED JAN. 13, 1903.
NO MODEL.

Witnesses:
R A Balderson
E. T. McKenn.

Inventor:
Joseph Scales
By Byrnes & Townsend.
Att'ys.

UNITED STATES PATENT OFFICE.

JOSEPH SCALES, OF NIAGARA FALLS, NEW YORK, ASSIGNOR TO UNION CARBIDE COMPANY, OF NIAGARA FALLS, NEW YORK, A CORPORATION OF VIRGINIA.

METHOD OF SUBDIVIDING BLOCKS OR INGOTS.

SPECIFICATION forming part of Letters Patent No. 722,759, dated March 17, 1903.

Application filed January 13, 1903. Serial No. 138,870. (No model.)

*To all whom it may concern:*

Be it known that I, JOSEPH SCALES, residing at Niagara Falls, in the county of Niagara and State of New York, have invented certain new and useful Improvements in Methods of Subdividing Blocks or Ingots, of which the following is a specification.

This invention relates to a method of subdividing blocks or ingots, and particularly to a method of detaching large pieces of calcium carbid from the blocks or ingots produced in carbid-furnaces. In electric furnaces of the type shown in United States Patent No. 597,880, issued January 25, 1898, to William Smith Horry, the formation of carbid is continuous and the product is obtained in the furnace as a block or ingot of great size and weight. In order to remove the carbid from the furnace, it is necessary that it be subdivided. This is accomplished according to my invention in the following manner: One or more holes are drilled or bored into the body of the block or ingot when it is still in a highly-heated state and at the same time a reagent capable of effecting disintegration of the carbid is injected into the cavity, preferably through the drill, and into contact with the carbid. The cutting-surface of the drill is thereby preserved and the drilling or boring operation is facilitated by the local disintegration of the carbid due to the reaction therewith of the injected reagent. A wedge may then be driven into the hole or holes made by the drill and a section of the desired size thereby broken off from the main block, the line of fracture passing through the drill-hole. As suitable reagents for the purpose I may mention air, water, and steam, all of which act to oxidize and therefore to disintegrate the carbid.

The invention will be readily understood by reference to the accompanying drawings, in which—

Figure 1:
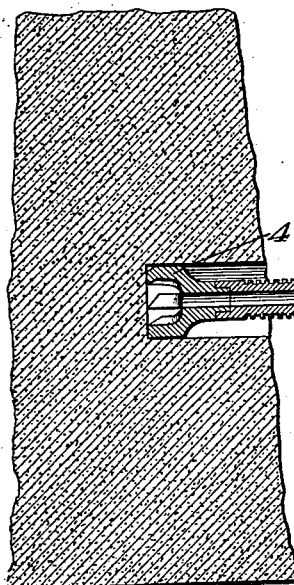
Figure 1:
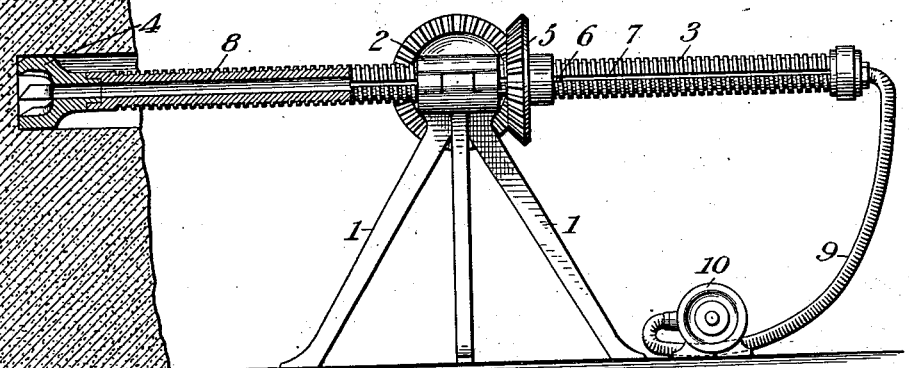
Figure 2:
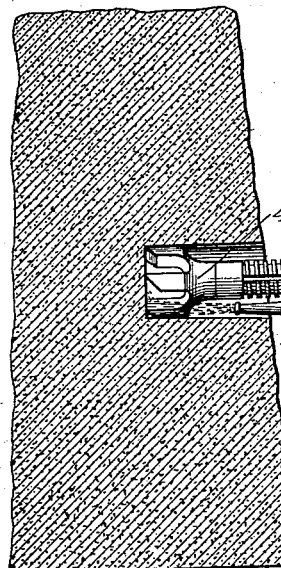
Figure 2:
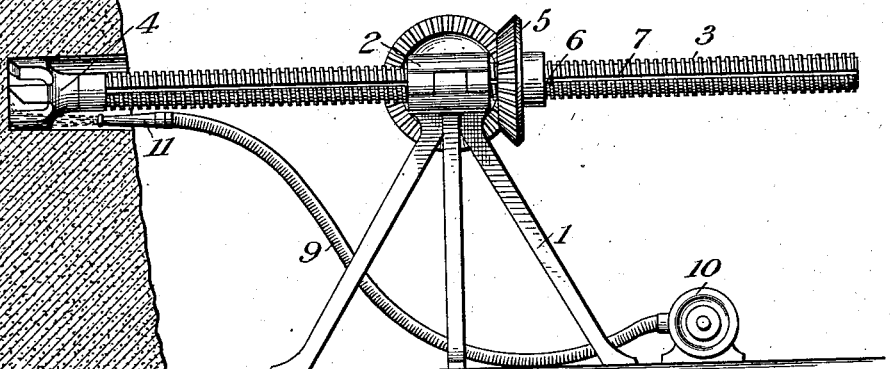

Figure 1 is a side elevation showing the block of carbid and a portion of the drill in vertical section, air or water being supplied through the hollow drill; and Fig. 2 is a side elevation with the block of carbid in vertical section, showing air or water injected into the bore-hole at one side of the drill.

The drill employed may be of any well-known or suitable construction. That shown in Figs. 1 and 2 comprises a standard 1, having at its upper end a head 2, within which is a horizontally-threaded passage. Through the head 2 passes a threaded shaft 3, which constitutes the stem of the drill and carries at its forward end a cutting-bit 4. The drill is simultaneously rotated and driven forward by a bevel-gear 5, journaled loosely on the threaded shaft 3, but having a spline 6, which engages a longitudinal groove 7 in the shaft. The stem 3 of the drill shown in Fig. 1 has a central passage 8, to and through which air or water is delivered by a flexible hose 9, leading from a pump 10. In the construction shown in Fig. 2 air or water is delivered into the bore-hole at one side of the drill by a nozzle 11, fed by hose 9 and pump 10. While the drill shown is one using a rotary or boring bit, a drill with a reciprocating bit may be employed or any mechanical device which will produce a recess or hole in the block to be subdivided.

Although the operation is best accomplished by the coincident use, as above described, of a drill and injected reagent, it may be effected by a jet of the reagent alone without the use of the drill or other mechanical appliance. In this case the local disintegration above referred to is relied upon to form a cavity or opening into which the wedge may be driven.

My method may be applied to other materials than calcium carbid, and other reagents than water, air, or steam may be employed, the particular reagent being chosen with reference to the character of the material upon which it is desired to operate. It is essential only that the reagent be capable of acting upon the block or ingot in a heated state to cause a local solution or disintegration, which will assist its subdivision, as above described.

I do not claim specifically herein the method which consists in subdividing blocks or ingots of carbid by the aid of a jet of water or steam, since such method is claimed in my copending application, Serial No. 106,217, filed May 6, 1902.

I claim—

1. The method of subdividing heated blocks or ingots, which consists in locally subjecting the heated block to the action of a reagent capable of effecting disintegration of the material to form a cavity therein, and then breaking the block through said cavity, as set forth.

2. The method of subdividing heated blocks or ingots, which consists in drilling the heated block, simultaneously injecting into the cavity formed by the drill a reagent capable of effecting disintegration of the material, and then breaking the block through said cavity, as set forth.

3. The method of subdividing heated blocks or ingots, which consists in drilling the heated block, simultaneously injecting through the drill into the cavity formed by the drill a reagent capable of effecting disintegration of the material, and breaking the block through said cavity, as set forth.

4. The method of subdividing heated blocks or ingots, which consists in drilling the block while retained within a furnace, simultaneously injecting into the cavity formed by the drill a reagent capable of effecting disintegration of the material, and then breaking the block through said cavity, as set forth.

5. The method of subdividing heated blocks or ingots, which consists in drilling the block while retained within a furnace, simultaneously injecting through the drill into the cavity formed by the drill, a reagent capable of effecting disintegration of the material, and then breaking the block through said cavity, as set forth.

6. The method of subdividing heated blocks or ingots of a carbid, which consists in locally subjecting the heated block to the action of a reagent capable of effecting disintegration of the carbid to form a cavity therein, and then breaking the block through the said cavity, as set forth.

7. The method of subdividing heated blocks or ingots of a carbid, which consists in drilling the block, simultaneously injecting into the cavity formed by the drill a reagent capable of effecting disintegration of the carbid, and then breaking the block through said cavity, as set forth.

8. The method of discharging carbid from an electric furnace, which consists in drilling a block or ingot of carbid while still retained within the furnace, simultaneously injecting into the cavity formed by the drill a reagent capable of effecting disintegration of the carbid, and then breaking the block through said cavity, as set forth.

9. The method of subdividing heated blocks or ingots of calcium carbid, which consists in locally subjecting the block to the action of air, thereby effecting local disintegration of the carbid to form a cavity therein, and then breaking the block through said cavity, as set forth.

10. The method of subdividing heated blocks or ingots of calcium carbid, which consists in drilling the block, simultaneously injecting air into the cavity formed by the drill, thereby effecting local disintegration of the carbid, and then breaking the block through said cavity, as set forth.

11. The method of subdividing heated blocks or ingots of calcium carbid, which consists in drilling the block, simultaneously injecting air through the drill into the cavity formed by the drill, thereby effecting local disintegration of the carbid, and then breaking the block through said cavity, as set forth.

12. The method of discharging calcium carbid from an electric furnace, which consists in drilling a block or ingot of carbid while still retained within the furnace, simultaneously injecting air into the cavity formed by the drill, thereby effecting local disintegration of the carbid, and then breaking the block through said cavity, as set forth.

In testimony whereof I affix my signature in presence of two witnesses.

JOSEPH SCALES.

Witnesses:
E. F. PRICE,
G. E. COX.